United States Patent
Wang et al.

(10) Patent No.: US 11,070,291 B2
(45) Date of Patent: Jul. 20, 2021

(54) COMMUNICATION TERMINAL BASED ON FREE SPACE OPTICAL COMMUNICATION, COMMUNICATION DEVICE AND COMMUNICATION SYSTEM

(71) Applicant: HANGZHOU MO-LINK TECHNOLOGY CO. LTD, Hangzhou (CN)

(72) Inventors: Hao Wang, Hangzhou (CN); Dong Wang, Hangzhou (CN)

(73) Assignee: HANGZHOU MO-LINK TECHNOLOGY CO. LTD, Hangzhou (CN)

( * ) Notice: Subject to any disclaimer, the term of this patent is extended or adjusted under 35 U.S.C. 154(b) by 0 days.

(21) Appl. No.: 16/724,044

(22) Filed: Dec. 20, 2019

(65) Prior Publication Data
US 2020/0213007 A1    Jul. 2, 2020

(30) Foreign Application Priority Data
Dec. 26, 2018    (CN) .......................... 201811603004.3

(51) Int. Cl.
*H04B 10/114*    (2013.01)
*H04B 10/50*    (2013.01)
(Continued)

(52) U.S. Cl.
CPC ....... *H04B 10/1141* (2013.01); *H04B 10/503* (2013.01); *H04B 10/671* (2013.01); *H04Q 11/0005* (2013.01); *H04Q 2011/0015* (2013.01)

(58) Field of Classification Search
None
See application file for complete search history.

(56) References Cited

U.S. PATENT DOCUMENTS

| 6,771,905 B1 * | 8/2004 | Bortz | H04J 14/02 |
| | | | 398/45 |
| 2002/0109884 A1 * | 8/2002 | Presley | H04B 10/1125 |
| | | | 398/121 |

(Continued)

FOREIGN PATENT DOCUMENTS

| JP | 2006-344915 | * 12/2006 | ............. H01S 5/022 |
| JP | 2017032731 | * 2/2017 | ............. G02B 6/42 |

*Primary Examiner* — Darren E Wolf
(74) *Attorney, Agent, or Firm* — Li & Cai Intellectual Property (USA) Office

(57) ABSTRACT

A communication terminal based on free space optical communication, a communication device, and a communication system are provided. The communication system includes a communication terminal, communication devices, and a master control device. The first communication device includes a light emitting unit configured to transmit an optical signal and a second switching control unit configured to establish a connection with the communication terminal that has received the optical signal. The communication terminal includes a light receiving unit configured to receive the optical signal transmitted by the first communication device and a first switching control unit configured to set the first communication device as a switching destination according to the optical signal. The master control device includes a third switching control unit configured to receive a switch request containing identification information of the communication terminal and transmit a connection instruction to the first switching control unit according to the switching request.

7 Claims, 2 Drawing Sheets

(51) Int. Cl.
*H04B 10/67* (2013.01)
*H04Q 11/00* (2006.01)

(56) References Cited

U.S. PATENT DOCUMENTS

| | | | |
|---|---|---|---|
| 2005/0117838 A1* | 6/2005 | Okada | G02B 6/359 |
| | | | 385/18 |
| 2005/0117904 A1* | 6/2005 | Choi | H04B 10/1149 |
| | | | 398/79 |
| 2006/0290928 A1* | 12/2006 | Fujita | G01J 3/2803 |
| | | | 356/328 |
| 2007/0002429 A1* | 1/2007 | Kamei | G01J 3/0202 |
| | | | 359/337.5 |
| 2019/0379454 A1* | 12/2019 | Mitchell | G02B 6/4249 |

* cited by examiner

COMMUNICATION TERMINAL BASED ON FREE SPACE OPTICAL COMMUNICATION, COMMUNICATION DEVICE AND COMMUNICATION SYSTEM

FIELD OF THE DISCLOSURE

The present disclosure relates to the field of information transmission technology, in particular, to communication terminal based on free space optical communication, a communication device, and a communication system.

BACKGROUND OF THE DISCLOSURE

With the increasing transmission capacity in the communication field, traditional transmission technologies have been difficult to meet the requirements of transmission capacity and transmission speed. In addition, as the computing capabilities of various smart terminals continue to increase and the volume of various smart terminals becomes thinner and lighter, the usage of cables traditionally used for signal transmission is becoming increasingly inconvenient for users. Although radio signal transmission technologies such as WIFI and Bluetooth can alleviate the inconvenience to some extent, the existing radio signal transmission technologies have obvious limitations on high-speed signal transmission.

SUMMARY OF THE DISCLOSURE

In order to overcome the problems in the related technology at least to a certain extent, the present disclosure provides a communication terminal based on free space optical communication, a communication device, and a communication system.

According to an object of the present disclosure, a communication terminal based on free space optical communication is provided, comprising a light receiving unit and a first switching control unit, wherein the light receiving unit is configured to receive an optical signal transmitted by a communication device, and the first switching control unit is configured to set the communication device as a switching destination according to the optical signal; wherein the light receiving unit comprises a collimating lens module, and an array lens module, a photodiode and an electric signal amplifier chip disposed on a substrate; and wherein the collimating lens module is configured to receive an optical signal transmitted to a free space by a communication device, and shape the received optical signal and then transmit the received optical signal to the array lens module; the array lens module is configured to make up the received optical signal and then transmit to the photodiode; the photodiode is configured to convert the optical signal into an electric signal and then transmit the electric signal to the electric signal amplifier chip for amplification; and the signal amplified by the electric signal amplifier chip is transmitted to an external circuit.

The communication terminal based on free space optical communication further comprises an optical fiber, and the array lens module is connected to the collimating lens module through the optical fiber.

When the array lens module employs one lens and commutates an optical path, the lens comprises a first surface, a second surface, and a third surface; and wherein an optical signal collimated by the collimating lens module enters the lens through the third surface of the lens, and after being reflected by the second surface, the optical signal is transmitted out of the lens by the first surface and enters the photodiode.

An angle between the second surface of the lens and an incident direction of the optical signal is 45°.

When the array lens module employs one lens and realizes a direct optical path, the lens comprises a fourth surface and a fifth surface; and an optical signal collimated by the collimating lens module enters the lens through the fifth surface of the lens, and after being transmitted out of the fourth surface, the optical signal enters the photodiode.

The communication terminal based on free space optical communication further comprises a demultiplexer, and the demultiplexer is configured to separate a received one-way optical signal into a multiple-way optical signal for transmission.

According to another object of the present disclosure, a communication device based on free space optical communication is provided, comprising a light emitting unit and a second switching control unit, wherein the light emitting unit is configured to transmit an optical signal, and the second switching control unit is configured to establish a connection with the communication terminal that has received the optical signal; wherein the light emitting unit comprises a laser driving chip, a laser, an array lens module, and a collimating lens module provided on a substrate; the laser driving chip is connected to the laser, the laser is connected to the array lens module, and the array lens module is directly connected to the collimating lens module or connected to the collimating lens module through an optical fiber; and wherein an electrical signal externally loaded with information is input to the laser driving chip, and the laser driving chip drives the laser to emit light; the optical signal is made up by the array lens module and then enters the collimating lens module through an optical fiber or directly enters the collimating lens module; and the collimating lens module collimates the transmitted optical signal and then transmits the transmitted optical signal to a free space for transmission.

The communication device based on free space optical communication further comprises a combiner, and the combiner is configured to combine a multiple-way optical signal into a one-way optical signal for transmission.

The communication device based on free space optical communication further comprises an optical fiber, and the array lens module is connected to the collimating lens module through the optical fiber.

According to yet another object of the present disclosure, a communication system is provided, comprising a communication terminal, a plurality of communication devices, and a master control device; wherein the first communication device among the plurality of communication devices comprises a light emitting unit and a second switching control unit, the light emitting unit is configured to transmit an optical signal, and the second switching control unit is configured to establish a connection with the communication terminal that has received the optical signal; wherein the communication terminal comprises a light receiving unit and a first switching control unit; the light receiving unit is configured to receive an optical signal transmitted by a first communication device; and the first switching control unit is configured to set the first communication device as a switching destination according to the optical signal; and wherein the master control device comprises a third switching control unit, and the third switching control unit is configured to receive a switching request of the first communication device from a plurality of communication devices, and the switching request comprises identification information of the communication terminal, and the third switching control unit transmits a connection instruction to the first switching control unit according to the switching request.

According to the foregoing specific embodiment of the present disclosure, it can be known that the present disclosure has at least the following beneficial effects. In the present disclosure, the communication device and the communication terminal are comprehensively coordinated and controlled through the master control device, and the communication device transmits an optical signal and the communication terminal receives the optical signal, so that the communication between the intelligent terminals is realized without cables. Compared with the existing radio signal transmission method, the transmission of optical signals can meet the needs of high-speed signal transmission.

It should be understood that the above general description and the following specific embodiments are merely exemplary and explanatory, and they should not limit the scope of the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE EXEMPLARY EMBODIMENTS

Figure 1:
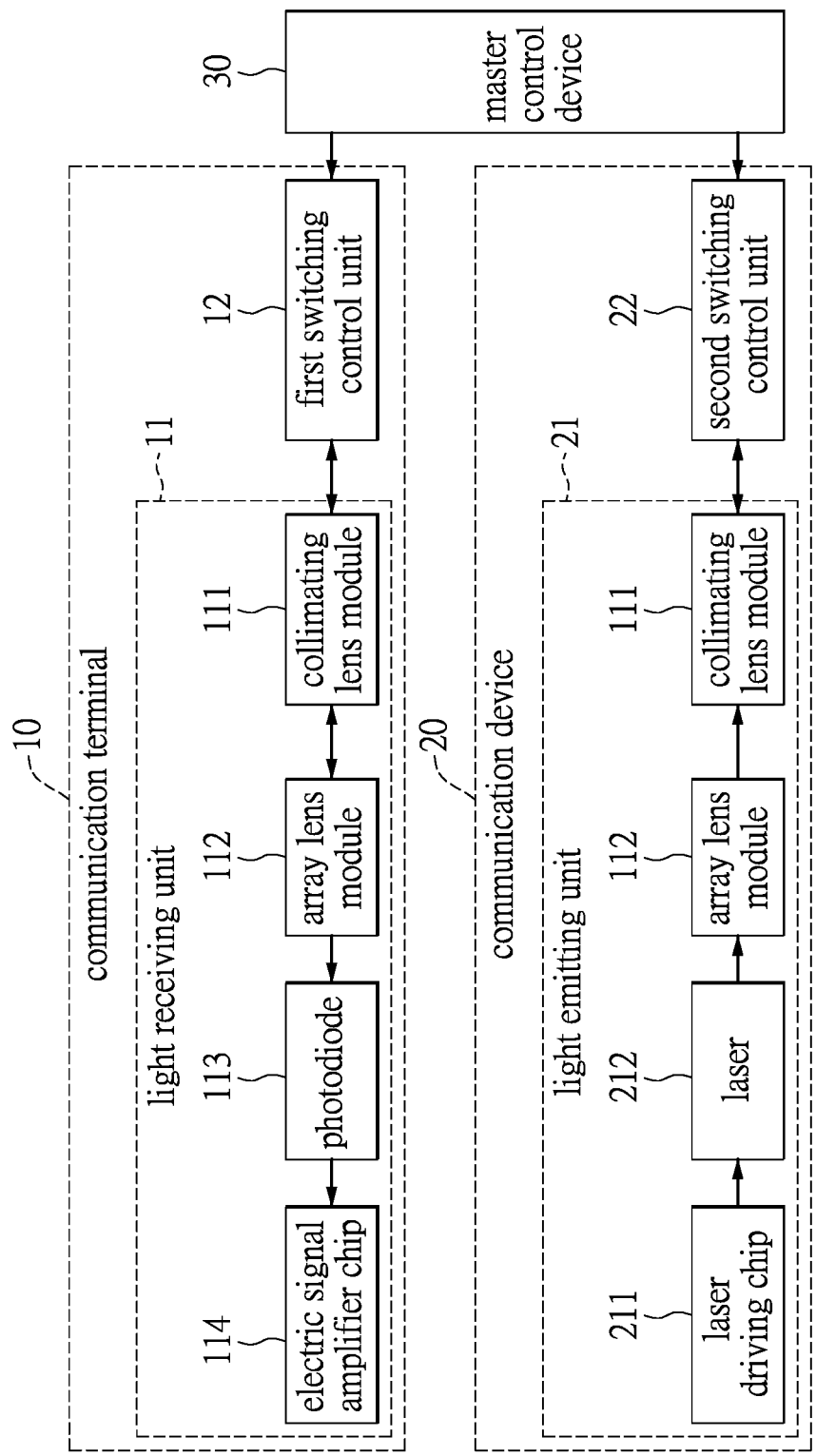
FIG. 1 is a schematic diagram of a communication system based on free space optical communication provided by a specific embodiment of the present disclosure.

In order to make the objectives, technical solutions, and advantages of the embodiments of the present disclosure clearer and clearer, the spirit of the content disclosed in the present disclosure will be clearly described below with the drawings and detailed description. As can be changed and modified by the techniques taught in the content of the present disclosure, it does not depart from the spirit and scope of the content of the present disclosure.

The exemplary embodiments of the present disclosure and the descriptions thereof are used to explain the present disclosure, but are not intended to limit the present disclosure. In addition, the same or similarly labeled elements/components are used in the drawings and the embodiments to represent the same or similar parts.

Regarding the "first", "second", . . . , etc. used herein, they do not specifically refer to the order or order, nor are they used to limit the application, which are only used to distinguish elements or operations described in the same technical terms.

Regarding the directional terms used in this document, such as: up, down, left, right, front or back, etc., they are only directions referring to the drawings. Therefore, the terminology is used to explain and is not used to limit the creation.

As used herein, "comprising," "including," "having," "containing," and the like are all open-ended terms, which means including but not limited to.

As used herein, "and/or" includes any and all combinations of the things.

The term "multiple" in the article includes "two" and "two or more"; and the term "multiple groups" in this article include "two" and "two or more".

Regarding the terms "roughly", "about", and the like used in this article, they are used to modify any quantity or error that can be slightly changed, but these slight changes or errors do not change its essence. Generally speaking, the range of minor changes or errors modified by such terms may be 20% in some embodiments, 10% in some embodiments, and 5% or other values in some embodiments. Those skilled in the art should understand that the aforementioned values may be adjusted according to actual needs, and are not limited thereto.

Certain terms used to describe the present disclosure will be discussed below or elsewhere in this specification to provide additional guidance to those skilled in the art on the description of the present disclosure.

Free space optical communication is a two-way communication technology that point-to-point, point-to-multipoint or multipoint-to-multipoint voice, data, and image information are realized in the atmospheric channel by laser. In short, it is an atmospheric wireless laser communication technology that combines the advantages of optical fiber communication and microwave communication. It has the advantages of large communication capacity and high-speed transmission without the need to lay optical fibers.

Embodiment 1

FIG. 1 is a schematic diagram of a communication system based on free space optical communication provided by the present disclosure. As shown in FIG. 1, a communication terminal based on free space optical communication 10 includes a light receiving unit 11 and a first switching control unit 12. The light receiving unit 11 is configured to receive an optical signal transmitted by a communication device 20, and the first switching control unit 12 sets the communication device 20 as a switching destination according to the optical signal. The light receiving unit 11 includes a collimating lens module 111, and an array lens module 112, a photodiode 113, and an electric signal amplifier chip 114 provided on a substrate. The substrate includes, but is not limited to, a PCB board, a ceramic substrate, and the like.

The collimating lens module 111 is configured to receive the optical signal transmitted to a free space by the communication device 20, and then shape the received optical signal and transmit it to the array lens module 112. The array lens module 112 is configured to make up the received optical signal and transmit it to the photodiode 113. The photodiode 113 is configured to convert the optical signal into electric signal and then transmit it to the electric signal amplifier chip 114 for amplification. The amplified output signal can be transmitted to an external circuit through a pin.

In this embodiment, both the array lens module 112 and the collimating lens module 111 can transmit the optical signal in a two-way transmission, and can also transmit the optical signal in a one-way transmission. The array lens module 112 can realize a commutating or direct optical path.

In this embodiment, the collimating lens module 111 uses one or more condensing lenses.

Figure 2:
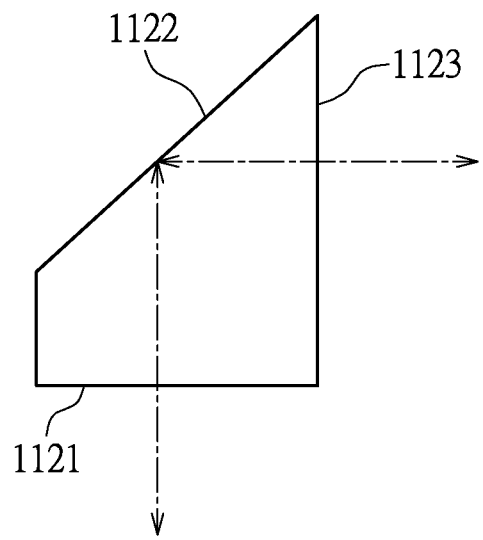
FIG. 2 is a schematic diagram of an embodiment of an array lens module in a communication system based on free space optical communication provided by a specific embodiment of the present disclosure.

FIG. 2 is a schematic diagram of an embodiment of the array lens module 112 in the communication terminal based on free space optical communication 10 of the present disclosure. The array lens module 112 may employ one or more lenses. When the array lens module 112 uses one lens and commutates an optical path, as shown in FIG. 2, the lens includes a first surface 1121, a second surface 1122, and a third surface 1123. When receiving a signal, the optical signal collimated by the collimating lens module 111 enters the lens through the third surface 1123 of the lens, and after being reflected by the second surface 1122, the optical signal is transmitted out of the lens by the first surface 1121, and enters the photodiode 113. Preferably, an angle between the second surface 1122 of the lens and an incident direction of the optical signal is 45°.

Figure 3:
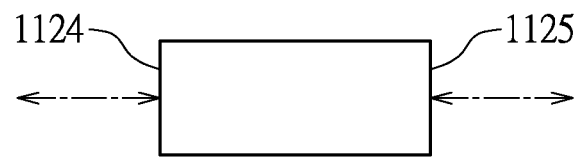
FIG. 3 is a schematic diagram of another embodiment of an array lens module in a communication system for free space optical communication provided by a specific embodiment of the present disclosure.

FIG. 3 is a schematic diagram of another embodiment of the array lens module 112 in the communication terminal based on free space optical communication 10 of the present disclosure. When the array lens module 112 employs one lens and realizes a direct optical path, as shown in FIG. 3, the lens includes a fourth surface 1124 and a fifth surface 1125. When receiving a signal, an optical signal collimated by the collimating lens module 111 enters the lens through the fifth surface 1125 of the lens, and is transmitted out of the lens through the fourth surface 1124, and enters the photodiode 113.

The communication terminal based on free space optical communication 10 provided in this embodiment is not limited to a smart phone, a notebook computer, a computer, a smart watch, and the like.

In the communication terminal based on free space optical communication 10 provided in the embodiment of the present disclosure, the collimating lens module 111 is directly connected to the array lens module 112 and configured to receive optical signals, which can replace copper wires, back plates, etc., improve the communication rate, reduce upgrade costs, and also simplify the design to meet different application needs.

Embodiment 2

As shown in FIG. 1, a communication terminal based on free space optical communication 10 includes a light receiving unit 11 and a first switching control unit 12. The light receiving unit 11 is configured to receive an optical signal transmitted by a communication device 20, and the first switching control unit 12 sets the communication device 20 as a switching destination according to the optical signal. The light receiving unit 11 includes a collimating lens module 111, an optical fiber, and an array lens module 112, a photodiode 113, and an electric signal amplifier chip 114 disposed on a substrate. The collimating lens module 111 is connected to the array lens module 112 through the optical fiber. One end of the photodiode 113 is connected to the array lens module 112, and the other end thereof is connected to the electric signal amplifier chip 114. The substrate includes, but is not limited to, a PCB board, a ceramic substrate, and the like.

The collimating lens module 111 is configured to receive an optical signal transmitted to the free space by the communication device 20, and shape the received optical signal and then transmit the received optical signal to the array lens module 112 through an optical fiber. The array lens module 112 is configured to make up the received optical signal and transmit the received optical signal to the photodiode 113.

The photodiode 113 is configured to convert the optical signal into electric signal and then transmit it to the electric signal amplifier chip 114 for amplification. The amplified output signal can be transmitted to an external circuit through a pin.

In this embodiment, both the array lens module 112 and the collimating lens module 111 can transmit the optical signal in a two-way transmission, and can also transmit the optical signal in a one-way transmission. The array lens module 112 can realize a commutating or direct optical path.

In this embodiment, the structures adopted by the array lens module 112 and the collimating lens module 111 are the same as those in the first embodiment and details are not described herein again.

The communication terminal based on free space optical communication 10 provided in this embodiment is not limited to a smart phone, a notebook computer, a computer, a smart watch, or the like.

In the communication terminal based on free space optical communication 10 provided in the embodiment of the present disclosure, a collimating lens module 111 is connected to the array lens module 112 through an optical fiber and configured to receive optical signals, which can replace copper wires, back plates, etc., improve communication speed, reduce upgrade costs and also simplify the design to meet different application needs.

Embodiment 3

On the basis of the first embodiment and the second embodiment, the communication terminal based on free space optical communication 10 further includes a demultiplexer, and the demultiplexer uses a WDM device that separates optical wavelengths. The demultiplexer is configured to separate a received one-way optical signal into a multiple-way optical signal for transmission. Specifically, the demultiplexer is disposed between the array lens module 112 and the photodiode 113.

On the basis of the first embodiment and the second embodiment, the communication terminal based on free space optical communication 10 further includes an alignment component. The alignment component may be a positioning pin or a positioning hole, and the alignment component is disposed on the substrate. The arrangement of the alignment component facilitates the alignment between the communication terminal 10 and the communication device 20, thereby contributing to the optical communication efficiency.

In specific use, a positioning pin is provided on the substrate of the light receiving unit 11 of the communication terminal 10, and a positioning hole is provided on the substrate of a light emitting unit of the communication device 20. The positioning pin and the positioning hole are used together to make the light receiving unit 11 of the communication terminal 10 align with the light emitting unit on the communication device 20.

Embodiment 4

An embodiment of the present disclosure further provides a communication device 20 including a light emitting unit 21 and a second switching control unit 22. The light emitting unit 21 is configured to transmit an optical signal, and the second switching control unit 22 is configured to establish a connection with the communication terminal 10 that has received the optical signal. The light emitting unit 21 includes a laser driving chip 211, a laser 212, an array lens module 112, and a collimating lens module 111 provided on a substrate. The laser driving chip 211 is connected to the laser 212, and the laser 212 is connected to the array lens module 112. The array lens module 112 is directly connected to the collimating lens module 111 or connected to the collimating lens module 111 through an optical fiber. The substrate includes, but is not limited to, a PCB board, a ceramic substrate, and the like.

An electric signal externally loaded with information is input to the laser driving chip 211, and the laser driving chip 211 drives the laser 212 to emit light. The optical signal is made up by the array lens module 112 and then enters the collimating lens module 111 through an optical fiber or directly enters the collimating lens module 111. The collimating lens module 111 collimates the transmitted optical signal and transmits it to a free space for transmission.

In this embodiment, both the array lens module 112 and the collimating lens module 111 can transmit the optical signal in a two-way transmission, and can also transmit the optical signal in a one-way transmission. The array lens module 112 can realize a commutating or direct optical path.

In this embodiment, the structures adopted by the array lens module 112 and the collimating lens module 111 are the same as those in the first embodiment and details are not described herein again. When the array lens module 112 uses one lens and commutates the optical path, the emitted light signal enters the lens through the first surface 1121 of the lens, and after being reflected by the second surface 1122, the optical signal is transmitted out of the lens by the third surface 1122 and enters the collimating lens module 111.

When the array lens module 112 uses one lens and realizes a direct optical path, the emitted light signal enters the lens through the fourth surface 1124 of the lens, and is transmitted out of the lens through the fifth surface 1125, and directly enters the collimating lens module 111.

The light emitting unit 21 in the communication device based on free space optical communication 20 provided in the embodiment of the present disclosure is directly connected to the collimator lens module 111 or is connected to the collimator lens module 111 through an optical fiber for optical signal transmission, which can replace copper wires, back plates, etc., improve communication speed, reduce upgrade costs and also simplify the design to meet different application needs.

The communication device based on free space optical communication 20 provided in this embodiment is not limited to a smart phone, a notebook computer, a computer, a smart watch, and the like.

In this embodiment, the communication device based on free space optical communication 20 further includes a combiner and the combiner uses a WDM device that synthesizes optical wavelengths. The combiner is configured to combine a multiple-way optical signal into a one-way optical signal for transmission. Specifically, the demultiplexer is disposed between the laser 212 and the array lens module 112.

Embodiment 5

An embodiment of the present disclosure further provides a communication system including a communication terminal 10, a plurality of communication devices 20, and a master control device 30. The first communication device 20 of the multiple communication devices 20 includes a light emitting unit 21 and a second switching control unit 22. The light emitting unit 21 is configured to transmit an optical signal, and the second switching control unit 22 is configured to establish a connection with the communication terminal 10 that has received the optical signal. The communication terminal 10 includes a light receiving unit 11 and a first switching control unit 12. The light receiving unit 11 is configured to receive an optical signal transmitted by the first communication device 20, and the first switching control unit 12 is configured to set the first communication device 20 as a switching destination according to the optical signal. The master control device 30 includes a third switching control unit. The third switching control unit is configured to receive a switching request of the first communication device 20 from a plurality of communication devices 20, and the switching request includes the identification information of the communication terminal 10. The switching control unit transmits a connection instruction to the second switching control unit 22 according to the switching request.

The communication system based on free space communication provided based on the foregoing embodiments of the present disclosure includes a communication terminal 10, a communication device 20, and a master control device 30. The communication system may be integrated or used separately. The communication device 20 and the communication terminal 10 are comprehensively coordinated and controlled through the master control device 30, and the communication device 20 transmits optical signals and the communication terminal 10 receives the optical signals, so that the communication between the intelligent terminals can be realized without cables. Compared with the existing radio signal transmission methods, the transmission of optical signals can meet the needs of high-speed signal transmission.

The present disclosure has been described in detail with reference to the preferred embodiments thereof, and the detailed description is not to be construed as limiting the scope of the invention. Various modification, equivalent replacement, and the like performed by those skilled in the art to the above-described embodiments under the present disclosure should be included in the scope of the present disclosure.

What is claimed is:

1. A communication terminal based on free space optical communication, comprising a light receiving unit, wherein the light receiving unit is configured to receive an optical signal transmitted by a communication device,
   wherein the light receiving unit comprises a collimating lens module, an array lens module, a photodiode, an optical fiber and an electric signal amplifier chip disposed on a substrate,
   wherein the collimating lens module is configured to receive an optical signal transmitted to a free space by a communication device, and shape the received optical signal and then transmit the received optical signal to the array lens module; the array lens module is configured to make up the received optical signal and then transmit the received optical signal to the photodiode; the photodiode is configured to convert the optical signal into an electric signal and then transmit the electric signal to the electric signal amplifier chip for amplification; and the signal amplified by the electric signal amplifier chip is transmitted to an external circuit, and
   wherein the array lens module is connected to the collimating lens module through the optical fiber.

2. The communication terminal based on free space optical communication according to claim 1, wherein when the array lens module employs one lens and commutates an optical path, the lens comprises a first surface, a second surface, and a third surface; and wherein an optical signal collimated by the collimating lens module enters the lens through the third surface of the lens, and after being reflected by the second surface, the optical signal is transmitted out of the lens by the first surface and enters the photodiode.

3. The communication terminal based on free space optical communication according to claim 1, wherein when the array lens module employs one lens and commutates an optical path, the lens comprises a first surface, a second surface, and a third surface; and wherein an optical signal collimated by the collimating lens module enters the lens through the third surface of the lens, and after being reflected by the second surface, the optical signal is transmitted out of the lens by the first surface and enters the photodiode.

4. The communication terminal based on free space optical communication according to claim 2, wherein an angle between the second surface of the lens and an incident direction of the optical signal is 45°.

5. The communication terminal based on free space optical communication according to claim 3, wherein an angle between the second surface of the lens and an incident direction of the optical signal is 45°.

6. The communication terminal based on free space optical communication according to claim 1, wherein when the array lens module employs one lens and realizes a direct optical path, the lens comprises a fourth surface and a fifth surface; and an optical signal collimated by the collimating lens module enters the lens through the fifth surface of the lens, and after being transmitted out of the fourth surface, the optical signal enters the photodiode.

7. The communication terminal based on free space optical communication according to claim 1, wherein when the array lens module employs one lens and realizes a direct optical path, the lens comprises a fourth surface and a fifth surface; and an optical signal collimated by the collimating lens module enters the lens through the fifth surface of the lens, and after being transmitted out of the fourth surface, the optical signal enters the photodiode.

* * * * *